C. A. TILLY.
COUPLING.
APPLICATION FILED JAN. 27, 1914.
1,154,944.
Patented Sept. 28, 1915.
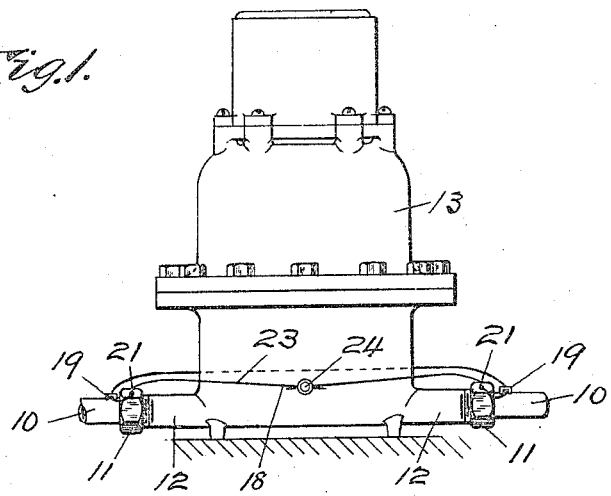
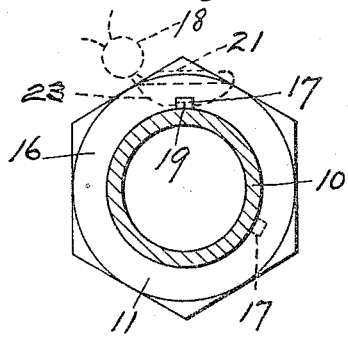
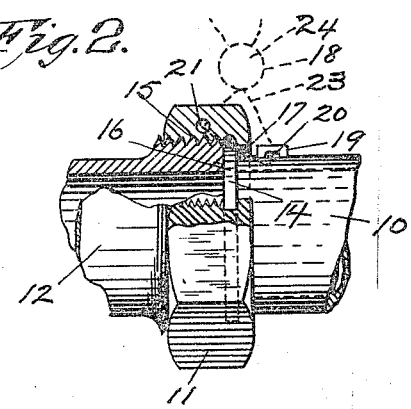
Witnesses:
Charles C. Abbe
M. Dumody
Inventor
Charles A. Tilly.
By his Attorney
W. T. Criswell

UNITED STATES PATENT OFFICE.

CHARLES A. TILLY, OF NEW YORK, N. Y.

COUPLING.

1,154,944. Specification of Letters Patent. Patented Sept. 28, 1915.

Application filed January 27, 1914. Serial No. 814,690.

*To all whom it may concern:*

Be it known that I, CHARLES A. TILLY, a citizen of the United States, and a resident of New York, borough of Brooklyn, county of Kings, and State of New York, have invented a certain new and useful Improvement in Couplings, of which the following is a full, clear, and exact specification.

This invention relates to a class of devices adapted to be used in conjunction with pipes.

My invention has for its object primarily to provide a device, or coupling designed to be employed especially for connecting the feed pipe and the delivery pipe to meters used for registering the consumption of water, gas, and the like in order to prevent one, or both of these pipes being disconnected from the meter for the purpose of tampering with the apparatus, or for applying other devices thereto. This is accomplished mainly by providing a tubular member or pipe adapted to be connected to the meter through the medium of a locking member, or nut, and providing both of the members with co-acting means whereby a sealing device may be employed for sealing these parts together so as to be prevented from being separately rotated without breaking the sealing element.

A further object of the invention is to provide a form of coupling combining simplicity and efficiency, and which is susceptible of being made in any desired shape and size.

A practical embodiment of the invention is represented in the accompanying drawing forming a part of this specification in which similar characters of reference indicate corresponding parts in all the views, the said invention being more fully described hereinafter, and then pointed out in the claim at the end of the description.

In the drawing, Figure 1 is an elevation of one form of meter with one form of coupling embodying my invention applied thereto. Fig. 2 is an enlarged fragmentary view, partly broken away, showing the manner of connecting the coupling to the nipple of a meter, and Fig. 3 is an end view of the coupling shown in Fig. 2.

The device, or coupling has a tubular member, or pipe 10, and a locking member, or nut 11 serving to connect the pipe to the nipple 12 of a meter, as 13, which may be of any type adapted to be employed for registering the consumption of water, gas, and the like.

The tubular member, or pipe 10 may be of any suitable shape and size to adapt it to be connected to the nipple of the meter, and this pipe is of a form having on one of its ends an annular flange 14 extending from its outer periphery. The locking member, or nut 11 is also of a type having a passage therethrough, and part of the wall of this passage is threaded, at 15. The threaded part of the passage 15 is of sufficient diameter to readily accommodate the annular flange 14 of the pipe when guided through the nut, and on one end of the nut and extending inwardly of its passage is an annular flange 16 provided with one or more slots 17. The opening of the annular flange 16 of the nut is slightly larger than the diameter of the pipe proper to permit the pipe to be freely movable therethrough, but this flange is of sufficient width to serve as a stop for preventing the flange 14 of the pipe from passing entirely out of the opening of the nut. To connect the pipe 10 to the nipple of a meter the pipe is directed through the threaded end of the opening of the nut 11 so that its flanges 14 will be seated in the nut in a manner to abut against the flange 16. The nut is then screwed by the use of a wrench, or otherwise on the exterior threaded end of the meter so that the parts will be tightly fastened together.

Serving as co-acting means to permit a sealing device, as 18, to be employed for preventing the nut and the pipe from being separately rotated when connected to the meter, on the exterior of the pipe 10, and spaced from its flange, is a lug 19 having an opening 20 therethrough, and in a suitable part of the wall of the nut is provided an opening 21. The opening 20 of the pipe and the opening 21 of the nut are preferably transversely disposed through these parts of the coupling, and when assembling the pipe and the nut together, as above described, the lug 19 is guided through one of the slots 17 of the flange of the nut. The sealing device 18 which may be of the usual form having a wire, as 23, is then disposed through both of the openings 20 and 21, and the free end portions of the wire are connected by the use of a lead seal, as 24, or other suitable material. When two couplings, one at the inlet and one at the outlet of the meter are used, as shown in Fig. 1, the wire 23 of the sealing device is guided through the openings 20 and 21 of the co-acting means of one coupling, and the wire is also directed through the openings of the co-acting means of the second coupling. The end portions of the wire are then secured together by one of the sealing devices 18. By the use of the coupling in the manner explained the feed pipe and the delivery pipes of meters of this class will be prevented from being disconnected for the purpose of surreptitiously tampering with the apparatus, or for applying other devices thereto.

In the foregoing description, I have embodied the preferred form of my invention, but I do not wish to be understood as limiting myself thereto, as I am aware that modifications may be made therein without departing from the principle, or sacrificing any of the advantages of this invention; therefore I reserve to myself the right to make such changes as fairly fall within the scope of the appended claim.

Having thus described my invention, I claim as new and desire to secure by Letters Patent:—

The combination with a meter including a casing having oppositely extending threaded nipples; of a coupling nut on each of said nipples provided with a transverse aperture at its periphery and having a flanged end, a flanged pipe coupled to each of said nipples by said nuts thereon and provided with a transversely apertured ear, and a filament passed through the apertures in said coupling nuts and apertures of said ears with the ends thereof joined and sealed, said filament passing around the meter.

This specification signed and witnessed this twenty-sixth day of January A. D. 1914.

CHARLES A. TILLY.

Witnesses:
 ROBT. B. ABBOTT,
 M. DERMODY.